United States Patent
Widemann

(10) Patent No.: US 6,408,995 B2
(45) Date of Patent: Jun. 25, 2002

(54) METHOD FOR FLUSHING THE CASING OF A HYDRAULIC MOTOR

(75) Inventor: Axel Widemann, Neumunster (DE)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 09/777,041

(22) Filed: Feb. 5, 2001

(30) Foreign Application Priority Data

Apr. 11, 2000 (DE) .......................................... 100 17 844

(51) Int. Cl.⁷ .............................................. F16D 65/78
(52) U.S. Cl. ................ 188/264 F; 188/170; 188/264 P; 475/161; 180/242; 180/370
(58) Field of Search ........................ 188/264 R, 264 B, 188/264 D, 264 F, 264 CC, 264 P, 157, 162, 170; 475/159, 161; 310/52–54, 58, 64; 180/65.5, 65.6, 242, 307, 308, 370

(56) References Cited

U.S. PATENT DOCUMENTS

| | | | | |
|---|---|---|---|---|
| 5,156,579 A | * | 10/1992 | Wakuta et al. .............. | 475/161 |
| 5,217,085 A | * | 6/1993 | Barrie et al. .............. | 184/104.1 |
| 5,698,912 A | * | 12/1997 | Rasch et al. ................... | 310/52 |
| 5,735,364 A | * | 4/1998 | Kinoshita .................... | 180/308 |
| 6,186,262 B1 | * | 2/2001 | Mann et al. ................. | 180/308 |
| 6,253,882 B1 | * | 7/2001 | White ........................ | 188/71.5 |

* cited by examiner

Primary Examiner—Pam Rodriguez

(57) ABSTRACT

A hydraulic motor (2) with a braking device (8), is acted upon by means of a control fluid via a brake release line (6). The brake release line (6) is used to allow a continuous flushing flow of control fluid through the hydraulic motor at the same time as the release of the brake. The braking device (8) is connected to the casing of the hydraulic motor (2). An outlet opening (12) of the hydraulic motor (2) leads via a leakage-oil line (13) to the tank for the control fluid. In a hydraulic travel drive with a closed hydraulic circuit, the brake release line (6) can be connected to the shut-off device (4) for the servo adjustment system of the variable-displacement pump (1), and the leakage-oil line (13) of the hydraulic motor (2) can lead to the tank for the entire hydraulic fluid in the system. Since the control fluid coming from the tank for the hydraulic fluid is always cooler than the hydraulic fluid used to drive the hydraulic motor (2) and circulating in the closed circuit, a cooling effect on the hydraulic motor (2) is obtained.

10 Claims, 2 Drawing Sheets

METHOD FOR FLUSHING THE CASING OF A HYDRAULIC MOTOR

BACKGROUND OF THE INVENTION

It is known that the temperature of the hydraulic fluid in a hydraulic device increases during operation. This applies particularly to hydraulic travel drives with a closed hydraulic circuit formed by a driven variable-displacement pump and a hydraulic motor connected to the latter by a feed line and a return line. The increase in the temperature of the hydraulic fluid has an effect on the hydraulic motor and is reflected in a significant increase in the temperature of the motor casing. It is therefore extremely advantageous to flush the hydraulic motor with cooler hydraulic fluid. This makes it possible to avoid a situation where the hydraulic motor reaches its limit temperature in continuous operation, thereby increasing its life.

One known solution for flushing the hydraulic motor with cool hydraulic fluid is to pass an additional line from the tank for the hydraulic fluid to the hydraulic motor. The hydraulic fluid in the tank is at a lower temperature than the hydraulic fluid in the closed hydraulic circuit. The structural implementation of this known method involves a large outlay on construction since it is necessary to pass an additional flushing line to the hydraulic motor, which is often very remote.

According to the prior art, a flushing valve has also already been inserted into the hydraulic motor, this valve diverting flushing oil from the respective lower pressure line of the high-pressure circuit in order to implement the method mentioned at the outset. However, it is often impossible to accommodate a flushing valve in the motor for structural reasons. In this case, it is necessary to have recourse to "cross-flushing", which likewise requires additional lines.

The prior art also includes hydraulic motors for driving by means of hydraulic fluid, with a braking device, which has a connection for a brake release line and is constructed in such a way that the braking action is canceled when the braking device is subjected to the pressure or a control fluid via the brake release line.

Hydraulic motors for driving by means of hydraulic fluid, with a braking device which has a connection for a brake release line and is constructed in such a way that the braking action is canceled when the braking device is acted upon by the pressure of a control fluid via the brake release line, are known. If the additional flow of hydraulic fluid flushing the casing of the hydraulic motor is passed into the braking device of the hydraulic motor when a hydraulic motor of this kind is provided, it is possible, by appropriate configuration of the braking device, to ensure that although, on the one hand, the braking action of the braking device is canceled, the additional flow of hydraulic fluid acting upon the braking device is, on the other hand, passed as a continuous flow through the casing of the hydraulic motor. This means that only a single additional flow of hydraulic fluid need be passed to the hydraulic motor, and it is thus only necessary to use a line which is already present in any case, namely the control line for the braking device, for an additional task.

It is therefore a principal object of this invention to provide a method for flushing the casing of a hydraulic motor, and of creating a hydraulic motor and a hydraulic drive, by means of which the casing of the hydraulic motor can be flushed in an effective manner and hence protected from an excessive increase in temperature without the need for a high outlay on construction.

These and other objects will be apparent to those skilled in the art.

SUMMARY OF THE INVENTION

The invention relates to a method for flushing the casing of a hydraulic motor with hydraulic fluid, the hydraulic motor being driven by hydraulic fluid which flows through and its casing being flushed with an additional flow of the hydraulic fluid, the temperature of which is lower than that of the hydraulic fluid that drives the hydraulic motor. The invention also relates to a hydraulic motor, a hydraulic drive and the use thereof.

The method of this invention is achieved by virtue of the fact that the additional flow of hydraulic fluid which flushes the casing of the hydraulic motor simultaneously acts on the braking device of the hydraulic motor in the sense of canceling the braking action.

In this invention provision is made for the additional flow of hydraulic fluid to pass through a restriction when it leaves the braking device, and for the restricted flow to pass through the casing of the hydraulic motor as a continuous flushing flow. Appropriate dimensioning of the restriction makes it possible to achieve the correct compromise between a sufficiently high effective pressure within the braking device to cancel the braking action, on the one hand, and a sufficiently strong flushing flow for the casing of the hydraulic motor, on the other hand.

Although the hydraulic fluid in the tank is already at a lower temperature in any case than, for example, the hydraulic fluid in the hydraulic circuit of a travel drive, the cooling effect can be improved even further, in accordance with a further refinement of the method, if, after leaving the casing of the hydraulic motor, the flushing flow is passed through a cooler and only then into the reservoir for the hydraulic fluid.

According to further advantageous refinements, structural implementations of the restriction present in the hydraulic motor according to the invention can comprise a preloaded non-return valve, a pressure-limiting valve or a nozzle. The hydraulic motor according to the invention fits well into known hydraulic drives if, according to an additional development, the outlet opening of the casing of the hydraulic motor is designed for connection to a leakage-oil line, which leads in the customary manner to the tank for the hydraulic fluid. A particularly advantageous development of a hydraulic drive of this kind consists in that the braking device is connected by a brake release line to a shut-off device which also enables and interrupts the supply of hydraulic fluid to the servo adjustment system of the variable-displacement pump, and that the outlet opening of the casing of the hydraulic motor is connected to the tank for the hydraulic fluid by a leakage-oil line. This keeps the outlay on construction particularly low because, of course, the shut-off device for the servo adjustment of the variable-displacement pump is present in any case and the release of the braking device must take place simultaneously with adjustment of the variable-displacement pump in any case. This ensures that the abrasion from the braking device is also fed to the filter system, and it is clear that the braking device too is cooled continuously by the relatively cold hydraulic fluid used exclusively for control.

In an expedient refinement of the hydraulic drive, provision is furthermore made for a cooler, which is connected to the leakage-oil line, to be arranged between the casing of the hydraulic motor and the tank for the hydraulic fluid.

The hydraulic drive according to the invention is suitable for many applications in which a significant increase in the temperature of the hydraulic fluid can be expected in continuous operation, e.g. in machines. However, the preferred use of the hydraulic drive according to the invention is as a travel drive in road and rail vehicles.

BRIEF DESCRIPTION OF THE DRAWINGS

In FIG. 1, the numeral 1 signifies a variable-displacement pump and 2 a hydraulic motor. The variable-displacement pump and the hydraulic motor 2 are connected to one another by a feed line and a return line A, B and thus form a closed hydraulic circuit. The variable-displacement pump is driven by a diesel engine, for example, and delivers hydraulic fluid, generally a hydraulic oil, to the hydraulic motor 2, which drives a vehicle. The variable-displacement pump is equipped with a servo adjustment system 3, which can be actuated mechanically, electrically or hydraulically. In this case, mechanical actuation is shown. Arranged upstream of the servo adjustment system 3 is a shut-off device 4, which enables and interrupts the supply of hydraulic fluid used as the control fluid to the servo adjustment system. The hydraulic fluid is fed to the shut-off device 4 via the line 5.

Figure 1:
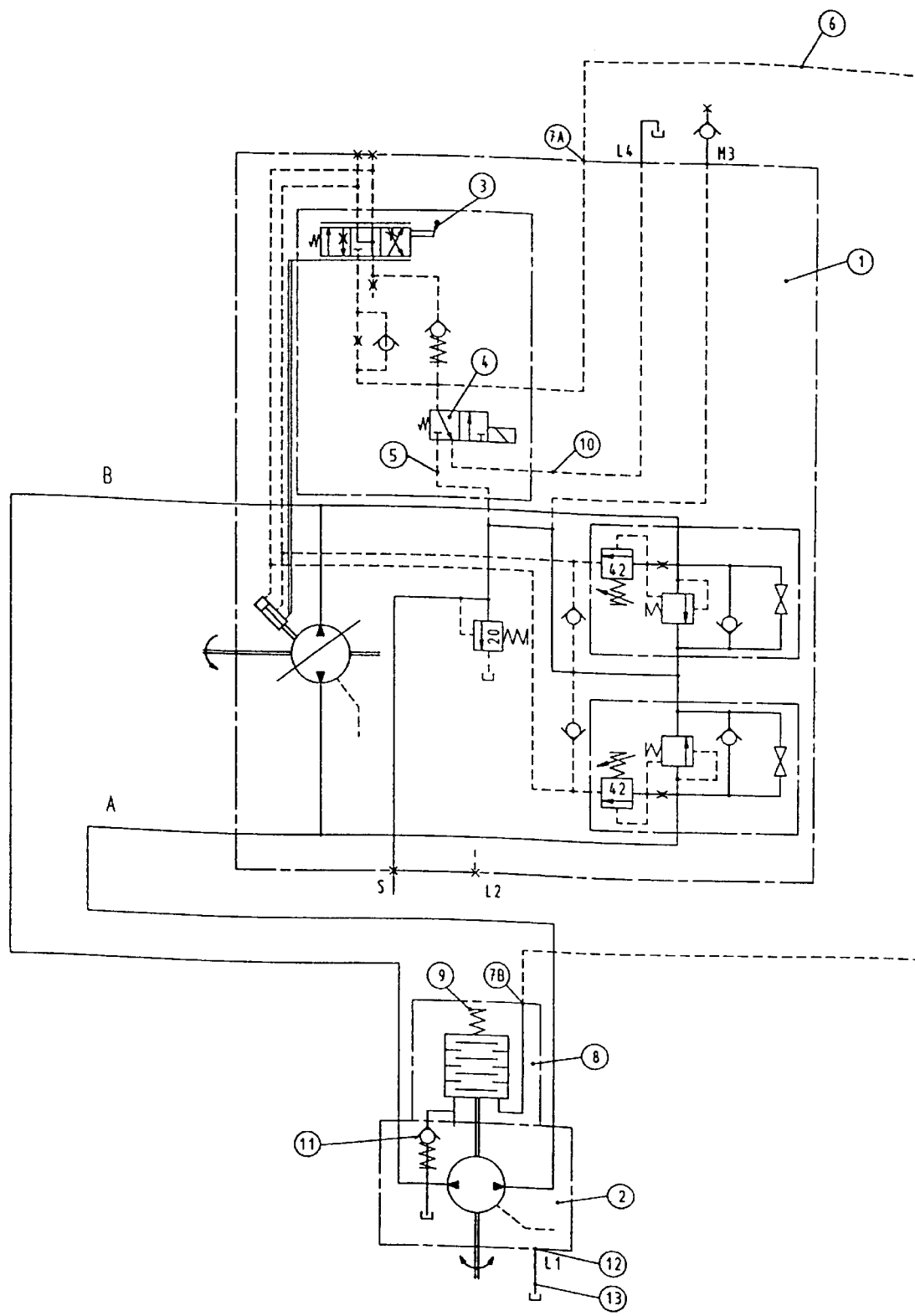
FIG. 1 shows a diagram of a hydraulic travel drive with a first embodiment of the hydraulic motor.

In the example illustrated, the shut-off device 4 is designed as a 3/2-way valve. It is connected via the connection 7A and the brake release line 6 and also by a connection 7B to the braking device 8 of the hydraulic motor 2. The braking device 8 is joined structurally to the hydraulic motor 2. It operates such that a spring assembly 9 brakes the motor shaft fast. However, the braking action can be canceled if a piston arranged in the braking device 8 compresses the spring assembly 9. The piston is acted upon by subjecting the interior of the braking device 8 to the pressure of the hydraulic fluid via the brake release line 6. Also provided is a leakage-oil line 10 leading from the shut-off device 4 to the tank for the fluid. Inserted into the hydraulic motor 2 is a pre-loaded non-return valve 11 or pressure-limiting valve which, when open, acts as a restriction and connects the casing of the hydraulic motor 2 to the braking device 8. The casing furthermore has an outlet opening 12, which is connected by a leakage-oil line 13 to the tank for hydraulic fluid.

The travel drive described with reference to FIG. 1 operates as follows: at the beginning of travel operation, the shut-off device 4 must be operated, causing the hydraulic fluid used for control to flow into the servo adjustment system 3 of the variable displacement pump 2 via the line 5. At the same time, the hydraulic fluid used for control flows via the connection 7A into the brake release line 6 and through the latter via the connection 7B into the braking device 8 of the hydraulic motor 2. There, it causes actuation of a piston and hence compression of the spring assembly 9, thereby releasing the brake and canceling the braking action. When a sufficiently high pressure of the hydraulic fluid has built up in the braking device 8, the non-return valve 11 opens and a continuous flow of hydraulic fluid is flushed through the casing of the hydraulic motor 2. Since the hydraulic fluid used for control is at a lower temperature than the hydraulic fluid circulating in the closed hydraulic circuit, the effect is to cool the hydraulic motor 2, and the casing of the hydraulic motor thus remains below the limit temperature even in continuous operation, thereby increasing the life of the motor. The flushing flow leaves the casing of the hydraulic motor via the outlet opening 12 and the leakage-oil line 13.

Figure 2:
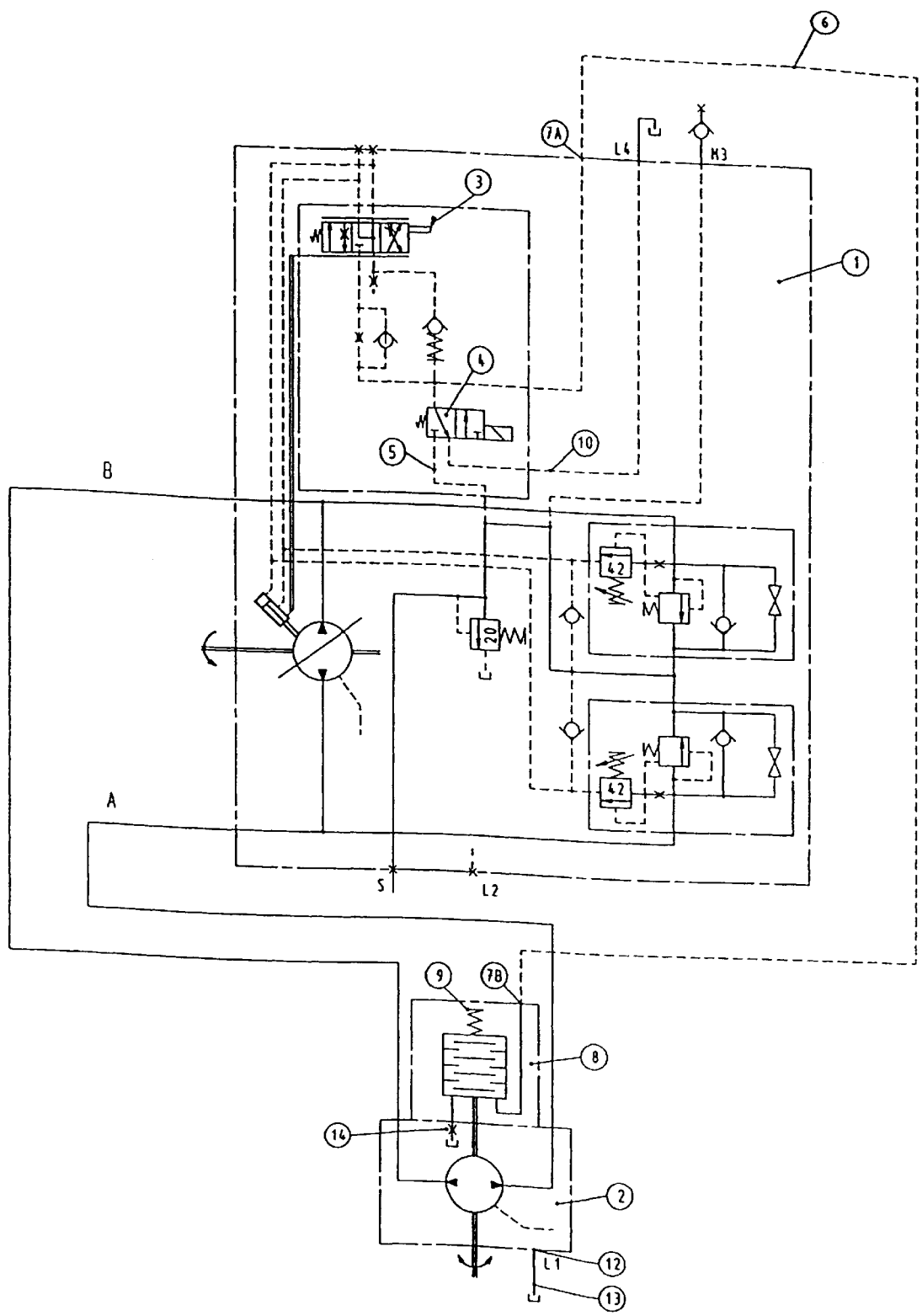
FIG. 2 shows the same diagram of a hydraulic travel drive with a modified embodiment of the hydraulic motor.

The travel drive shown in FIG. 2 differs from that in FIG. 1 only in that the non-return valve 11 in the hydraulic motor 2 is replaced by a nozzle 14. In this case, it is therefore not necessary for a certain limiting pressure to be built up in the braking device 8 before the flushing flow through the casing of the hydraulic motor 2 starts. The flow through the nozzle 14 regulates itself in a known manner.

A list of reference symbols used in the drawings is as follows:

| | |
|---|---|
| 1 | Variable-displacement pump |
| 2 | Hydraulic motor |
| 3 | Servo adjustment system |
| 4 | Shut-off device |
| 5 | Line |
| 6 | Brake release line |
| 7A | Connection |
| 7B | Connection |
| 8 | Braking device |
| 9 | Spring assembly |
| 10 | Leakage-oil line |
| 11 | Nonreturn valve |
| 12 | Outlet opening |
| 13 | Leakage-oil line |
| 14 | Nozzle |
| A, B | Feed and return lines |

It is therefore seen that this invention will accomplish at least all of its stated objectives.

I claim:

1. A method for flushing the casing of a hydraulic motor with hydraulic fluid, comprising, taking a hydraulic motor having a casing and being driven by a first hydraulic fluid which flows through the casing, flushing the casing with an additional flow of supplemental hydraulic fluid having a temperature lower than the temperature of the first hydraulic fluid, wherein the supplemental hydraulic fluid simultaneously acts on a braking device through a brake line of the hydraulic motor to cancel any braking action.

2. The method as claimed in claim 1, wherein the additional flow of supplemental hydraulic fluid passes through a restriction when said flow of supplemental hydraulic fluid leaves the braking device, and thence passes through the casing of the hydraulic motor as a continuous flushing flow.

3. The method as claimed in claim 2, wherein, after leaving the casing of the hydraulic motor, the supplemental hydraulic fluid is passed through a cooler and into a reservoir for the hydraulic fluid.

4. A hydraulic motor for driving by means of a hydraulic fluid, with a braking device (8), which has spaced apart hydraulic inlet and outlet connections including an inlet connection (7B) for a brake release line (6) and is constructed in such a way that the braking action is canceled when the braking device (8) is subjected to a pressure of control fluid via the brake release line (6), wherein the casing of the hydraulic motor (2) is fluidly connected to the outlet connection of the braking device (8) in terms of flow by a restriction (11; 14) and has an outlet opening (12) for the control fluid flowing in from the braking device (8).

5. The hydraulic motor as claimed in claim 4, wherein the braking device (8) is connected to the casing of the hydraulic motor (2) in terms of flow by a preloaded non-return valve (11).

6. The hydraulic motor as claimed in claim 4, wherein the braking device (8) is connected to the casing of the hydraulic motor (2) in terms of flow by a pressure-limiting valve.

7. The hydraulic motor as claimed in claim 4, wherein the braking device (8) is connected to the casing of the hydraulic motor (2) in terms of flow by a nozzle (14).

8. The hydraulic motor as claimed in claim 4, wherein the outlet opening (12) of the casing of the hydraulic motor (2) is designed for connection to a leakage-oil line (13).

9. A hydraulic drive, comprising:
- a tank for hydraulic fluid,
- a variable displacement pump (1) having a servo adjustment system (3) associated therewith,
- a hydraulic motor (2) having a casing with an outlet opening (12) therein fluidly connected by a leakage-oil line (13) to the tank for hydraulic fluid,
- the pump (1) and the motor (2) being connected in a closed hydraulic circuit by a feed line and a return line (A, B),
- a braking device (8) which has spaced apart hydraulic inlet and outlet connections including an inlet connection (7B) for a brake release line (6) fluidly connected to a shut-off device (4) which also enables and interrupts the supply of hydraulic fluid to the servo adjustment system (3) of the variable-displacement pump (1), the outlet connection of the braking device (8) being connected to the casing of the hydraulic motor (2), and
- wherein the outlet opening (12) of the casing of the hydraulic motor (2) is connected to the tank for the hydraulic fluid by the leakage-oil line (13).

10. The hydraulic drive as claimed in claim 9, wherein a cooler, which is connected to the leakage-oil line, is arranged between the casing of the hydraulic motor and the tank for the hydraulic fluid.

* * * * *